(No Model.)

J. G. PENNYCUICK.
METHOD OF FORMING SCREW THREADS ON GLASS.

No. 324,157. Patented Aug. 11, 1885.

Witnesses
G. B. Maynadier
J. R. Snow

Inventor
James G. Pennycuick
by his attorney,
G. E. Maynadier

UNITED STATES PATENT OFFICE.

JAMES G. PENNYCUICK, OF BOSTON, MASSACHUSETTS.

METHOD OF FORMING SCREW-THREADS ON GLASS.

SPECIFICATION forming part of Letters Patent No. 324,157, dated August 11, 1885.

Application filed June 26, 1884. (No model.)

*To all whom it may concern:*

Be it known that I, JAMES G. PENNYCUICK, of Boston, in the county of Suffolk and State of Massachusetts, have invented certain new and useful Improvements in Methods of Forming Screw-Threads on Glass, of which the following is a specification.

Heretofore, in forming screw-threads on glass or similar material, the material has been pressed, while in a plastic state, against a plunger provided with a screw-thread corresponding to that desired to be formed on the material. The plunger has usually been withdrawn by unscrewing before the plastic material had sufficiently set, and has heretofore always been withdrawn before the molded article was placed in the annealing-kiln. Either by withdrawing the plunger before the material has properly set or by the action of the heat while in the annealing-kiln, the screw-threads are rendered imperfect and in many cases useless.

The object of my invention is to insure a perfect screw-thread being formed on every finished article, and thereby obviate the difficulties heretofore experienced from imperfect threads and the loss occasioned by articles being rendered useless.

To this end my invention consists in leaving a plunger in contact with each article until such article has been annealed, substantially as hereinafter described, reference being had to the accompanying drawings, which illustrate so much of a glass-press as is deemed necessary to show the first step of my invention, and in which—

Figure 1:
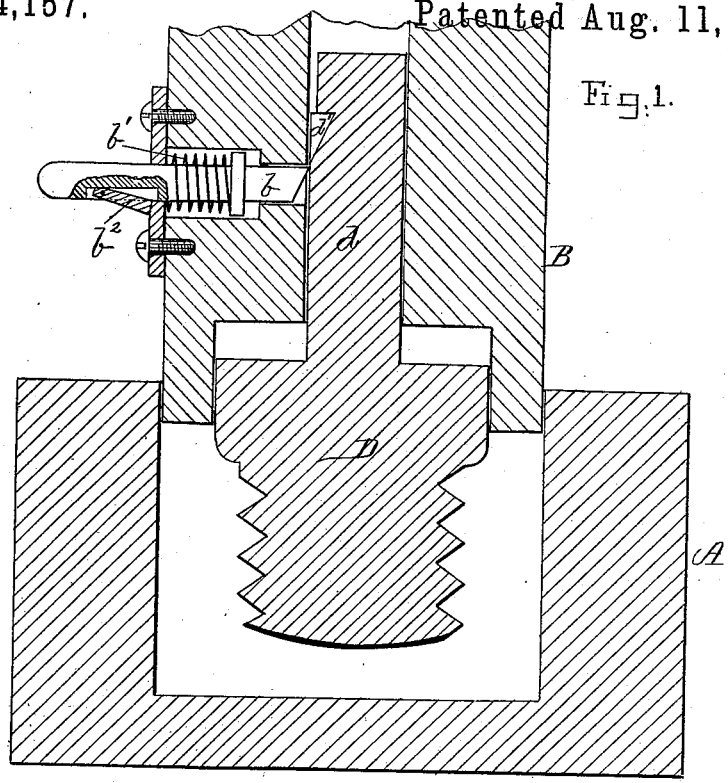
Figure 2:
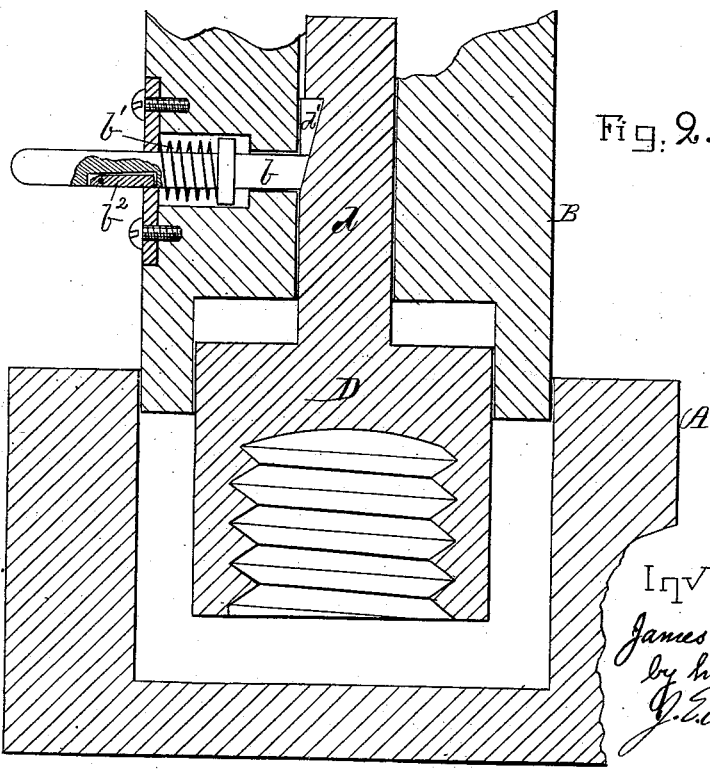

Figure 1 is a section showing a plunger for an inner screw-thread, and Fig. 2 a section showing a plunger for an outer screw-thread.

A represents a mold of the usual construction and formed to give any desired shape to the article. B is the follower, adapted to reciprocate in guides by means of a lever, in a way too well known to need representation or description. The lower end of the follower B is made hollow to receive the tang $d$ of a screw-threaded plunger, D, and is provided with a bolt, $b$, having a spring, $b'$, which has a tendency to keep the inner end of the bolt projecting into the hollow in the follower B. A catch, $b^2$, is attached to the bolt $b$ to retain it when its inner end is forced back against the spring $b'$, so as not to project into the hollow in the follower. The tang $d$ is provided with a notch, $d'$, into which the inner end of the bolt $b$ is thrown by the spring $b'$ when the tang is inserted in the follower and the catch $b^2$ is released.

In depressing the follower into the plastic material contained in the mold the bolt is automatically withdrawn, in this instance, by means of the incline on the tang and the oppositely-inclined inner end of the bolt, and is retained in its withdrawn position by means of the catch, so that the follower may be raised to clear the tang and leave the plunger in place in the glass in the mold. The article is taken from the mold to the annealing-kiln, and is annealed and allowed to cool before the plunger is withdrawn, thereby insuring a thread in the finished article the exact counterpart of that of the plunger.

I have found in practice that it is desirable, and perhaps necessary, to obtain the best results, that the plunger should be coated with some substance to prevent the glass adhering to it. Coating the plunger with plumbago will answer the purpose. I also advise any one in practicing my invention to heat the plunger to a high temperature and to have the glass at as low a temperature as it can be worked at. The object of this is to counteract the differences in the expansion and contraction of the plunger and the glass.

Obviously, in carrying out my improved method, a large number of screw-threaded plungers are requisite, but as they can be procured at small expense, and as each and every article is finished with a perfect thread, the advantages of my method over the old way, in which a large percentage of the articles were ruined by the threads being distorted, will be apparent.

I do not claim a detachable plunger not removed while in the newly-formed article, but remaining therein until the article has set, as that is shown in Patent No. 113,393, April 4, 1871, to Wm. Brookfield. In Brookfield's process the plunger is removed before the article is placed in the annealing-kiln, and in many of the articles the screw-threads are rendered imperfect by the heat while being annealed.

I believe that I am the first to anneal an article of glass while in contact with a screw-threaded plunger. I also believe that I am the first to make the plunger automatically detachable from the follower.

I claim as my invention—

The method of forming screw-threads on articles of glass or like material hereinbefore described, consisting in molding the articles in contact with a screw-threaded plunger and annealing the articles before withdrawing the plunger, substantially as set forth.

J.G. PENNYCUICK.

Witnesses:
W. A. COPELAND,
JOHN R. SNOW.